(12) United States Patent
Yohe et al.

(10) Patent No.: US 7,547,052 B2
(45) Date of Patent: Jun. 16, 2009

(54) ROBOTIC HEAD FOR PALLETIZING FULL BOXES, TRAY PACKS AND SPOT PACKS

(75) Inventors: Peter D. Yohe, Bloomsburg, PA (US); Ronald H. Cordingly, Berwick, PA (US)

(73) Assignee: Dyco, Inc., Bloomsburg, PA (US)

( * ) Notice: Subject to any disclaimer, the term of this patent is extended or adjusted under 35 U.S.C. 154(b) by 426 days.

(21) Appl. No.: 11/420,360

(22) Filed: May 25, 2006

(65) Prior Publication Data

US 2007/0272515 A1  Nov. 29, 2007

(51) Int. Cl.
*B25J 15/00* (2006.01)
*B25J 15/06* (2006.01)

(52) U.S. Cl. .................. 294/2; 294/119.1; 294/88; 294/103.1

(58) Field of Classification Search ............ 294/2, 294/88, 103.1, 104, 106, 119.1, 67.31, 67.33, 294/86.4, 81.51, 81.54, 81.61, 81.62
See application file for complete search history.

(56) References Cited

U.S. PATENT DOCUMENTS

| | | | |
|---|---|---|---|
| 1,425,556 A | 8/1922 | Tingwall et al. | |
| 3,140,771 A | 7/1964 | Harrison et al. | |
| 3,140,772 A | 7/1964 | Seragnoli | |
| 3,613,863 A | 10/1971 | Hedrick et al. | |
| 4,215,774 A | 8/1980 | Manservisi | |
| 4,515,275 A | 5/1985 | Mills et al. | |
| 4,526,266 A | 7/1985 | Dietz | |
| 4,563,031 A * | 1/1986 | Kishimoto et al. ...... 294/81.21 |
| 4,603,896 A * | 8/1986 | Vasseur et al. ............. 294/2 |
| 4,604,704 A | 8/1986 | Eaves et al. | |
| 4,850,627 A * | 7/1989 | Franklin .................. 294/2 |
| 5,088,783 A * | 2/1992 | Squires ................ 294/81.54 |
| 5,092,450 A | 3/1992 | Schommartz et al. | |
| 5,094,337 A | 3/1992 | van Veldhuisen et al. | |
| 5,330,311 A * | 7/1994 | Cawley et al. ......... 414/416.01 |
| 5,338,150 A * | 8/1994 | Focke et al. ............ 414/799 |
| 5,482,427 A | 1/1996 | Olson | |
| 5,531,310 A | 7/1996 | Itoh | |
| 6,047,526 A | 4/2000 | Draghetti | |
| 6,527,500 B1 | 3/2003 | Gelardi et al. | |
| 6,860,531 B2 * | 3/2005 | Sherwin ................. 294/2 |
| 6,923,486 B1 * | 8/2005 | Slagman ............... 294/115 |

FOREIGN PATENT DOCUMENTS

GB         2101062 A         5/2006

* cited by examiner

*Primary Examiner*—Dean J Kramer
(74) *Attorney, Agent, or Firm*—McNees Wallace & Nurick, LLC

(57) ABSTRACT

A robotic head for use in palletizing products includes a body having opposed ends. A portion of a first clamping assembly is pivotably connected at one end of the body and extends to a first lip, the portion having an axis of rotation that is substantially parallel to the first lip. A second clamping assembly is disposed at the opposite end of the body and is movable both toward and away from the first clamping assembly. The second clamping assembly includes a second segment having a second lip, the second segment being pivotably connected with respect to the rest of the second clamping assembly. The second segment has an axis of rotation that is substantially parallel to the second lip of the second segment. The first and second clamping assemblies are independently operable, and capable of manipulating a box or a tray pack containing products.

21 Claims, 5 Drawing Sheets

ROBOTIC HEAD FOR PALLETIZING FULL BOXES, TRAY PACKS AND SPOT PACKS

FIELD OF THE INVENTION

The present invention is directed to a robotic head for use in palletizing products, and specifically to a single robotic head compatible for use in palletizing full boxes, tray packs and spot packs.

BACKGROUND OF THE INVENTION

When large numbers of a product must be transported in large quantities to another location, especially a smaller product, the product is typically packaged in a container to protect the product during shipping of the container. Additionally, the container, such as a box, is configured to secure a compact grouping or array of the product. The containers are sized so that multiple containers can be arranged and stacked on a pallet having a footprint which can be accommodated by freight hauling compartments, e.g., for truck, rail, sea or air vessels.

While boxes are commonly used to secure products, savings can sometimes be achieved by using tray packs or spot packs. A tray pack consists of products which are arranged and placed in a tray, i.e., a partial box including a bottom surrounded by shallow vertical walls disposed along the periphery of the bottom. A spot pack consists of products, which are arranged and placed in a flat layer of material, such as cardboard. Once the products have been placed on the tray or layer of material, a layer of plastic is then wrapped around the combined tray and products.

Packaging is becoming increasingly automated in manufacturing facilities, wherein containers containing products are moved via a conveyor, which containers are manipulated by robots onto pallets. While such processing may work well if only a single size of product is produced and packaged in the same size and type of container, most manufacturing facilities not only produce products of different size, but entirely different products. That is, for example, during a portion of a work shift, boxes of a certain size for one product must be palletized, but during a later portion of the work shift, either differently sized boxes, tray packs or even spot packs must be palletized. Currently, robotic head constructions that can be used to manipulate boxes containing products cannot also be used to manipulate tray packs or spot packs containing products.

What is needed is a single robotic head construction that is compatible for manipulating boxes, tray packs and spot packs containing products.

SUMMARY OF THE INVENTION

The present invention relates to a clamp head for use in palletizing products including a body having a first end and an opposed second end. A first clamping assembly includes a first portion extending away from the body. A second portion is pivotably connected to the body adjacent the first portion, the first portion disposed between the second portion and the second end. The second portion extends to a second portion lip opposite the body. The second portion lip is directed toward the second end and extendable between the first portion and the second end, the second portion having an axis of rotation that is substantially parallel to a juncture between the second portion lip and the second portion. At least one second clamping assembly is movably secured to the body between the first clamping assembly and the second end. The at least one second clamping assembly is movable toward and away from the first clamping assembly. The at least one second clamping assembly includes a first segment extending away from the body and a second segment pivotably connected to an end of the first segment opposite the body. The second segment extends to a second segment lip directed toward the first clamping assembly. The at least one second segment has an axis of rotation that is substantially parallel to the second segment lip. The first and second clamping assemblies are independently operable, and capable of manipulating a box, tray pack or spot pack containing products.

The present invention further relates to a robot for use in palletizing products, including a base and an arm having a plurality of pivoting joints. The arm extends from the base to a clamp head including a body having a first end and an opposed second end. A first clamping assembly includes a first portion extending away from the body and a second portion pivotably connected to the body adjacent the first portion. The first portion is disposed between the second portion and the second end, the second portion extending to a second portion lip opposite the body. The second portion lip is directed toward the second end and extendable between the first portion and the second end. The second portion has an axis of rotation that is substantially parallel to a juncture between the second portion lip and the second portion. At least one second clamping assembly is movably secured to the body between the first clamping assembly and the second end, the at least one second clamping assembly movable toward and away from the first clamping assembly. The at least one second clamping assembly includes a first segment extending away from the body and a second segment pivotably connected to an end of the first segment opposite the body. The second segment extends to a second segment lip directed toward the first clamping assembly, the at least one second segment having an axis of rotation that is substantially parallel to the second segment lip. The first and second clamping assemblies are independently operable, and capable of manipulating a box, tray pack or spot pack containing products.

The present invention still further relates to a robotic clamp head for use in palletizing products including a frame having a first end and an opposed second end. A first clamping assembly includes a substantially planar first portion extending substantially vertically away from the frame and a second portion pivotably connected to the frame adjacent the first portion. The first portion is disposed between the second portion and the second end, the second portion extending to a second portion lip opposite the frame. The second portion lip is directed toward the second end and extendable between the first portion and the second end. The second portion has an axis of rotation that is substantially parallel to a juncture between the second portion lip and the second portion, the second portion being movable by a pneumatic actuator. A pair of second clamping assemblies are provided, each second clamping assembly movably secured to the frame between the first clamping assembly and the second end of the frame. Each of the pair of second clamping assemblies are movable toward and away from the first clamping assembly by a pneumatic actuator. Each second clamping assembly includes a substantially planar first segment extending substantially vertically away from the frame. A second segment is pivotably connected to an end of the first segment opposite the frame, the second segment extending to a second segment lip directed toward the first clamping assembly by a pneumatic actuator. The at least one second segment has an axis of rotation that is substantially parallel to a juncture between the second segment lip and the second segment. The first and second clamping assemblies are independently operable, and capable of manipulating a box or a tray pack containing products.

An advantage of the present invention is that a single head construction can be used for different types of product containers.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
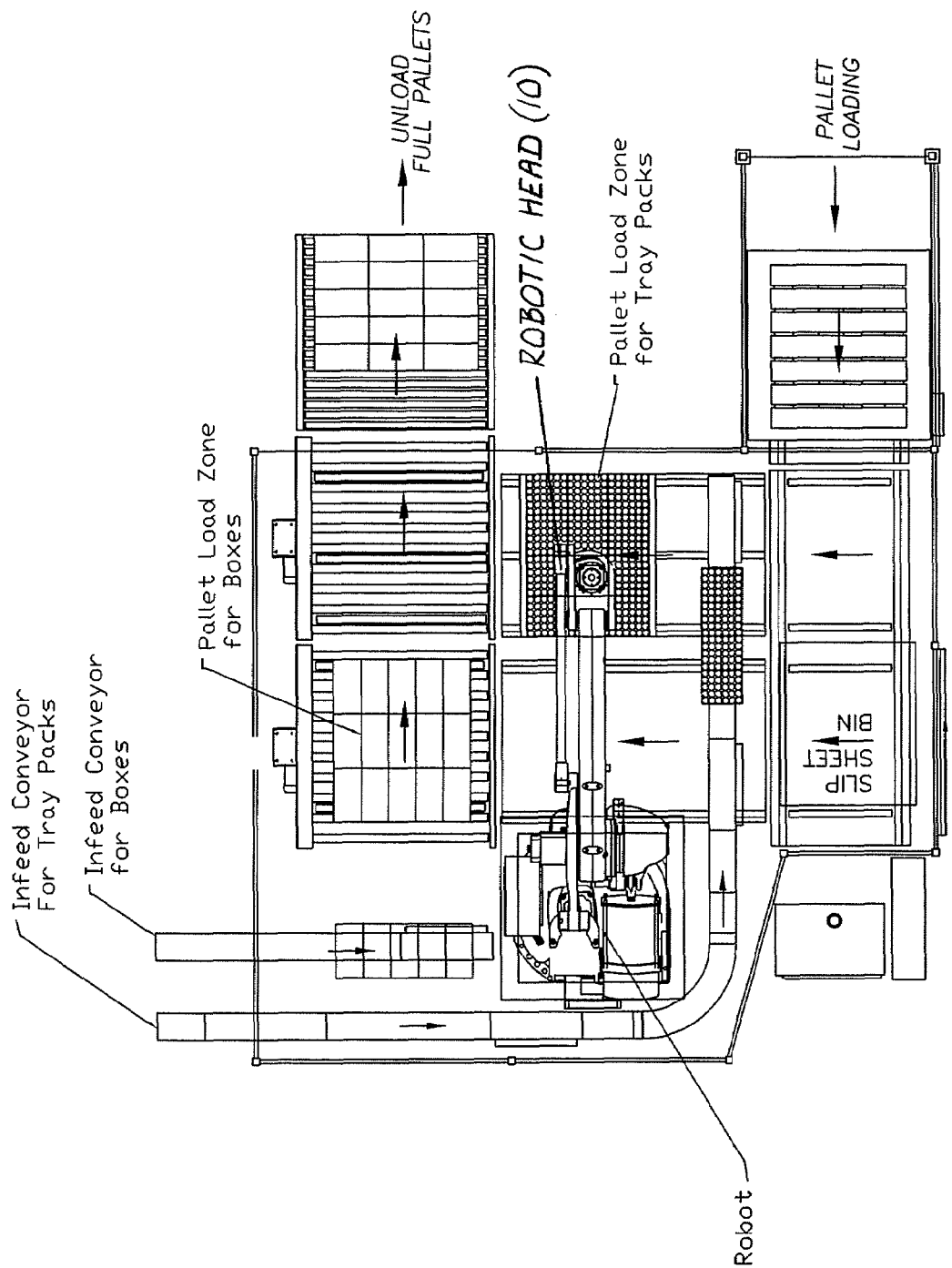
FIG. 1 is a plan view of a robotic palletizing cell having a head of the present invention.
Figure 2:
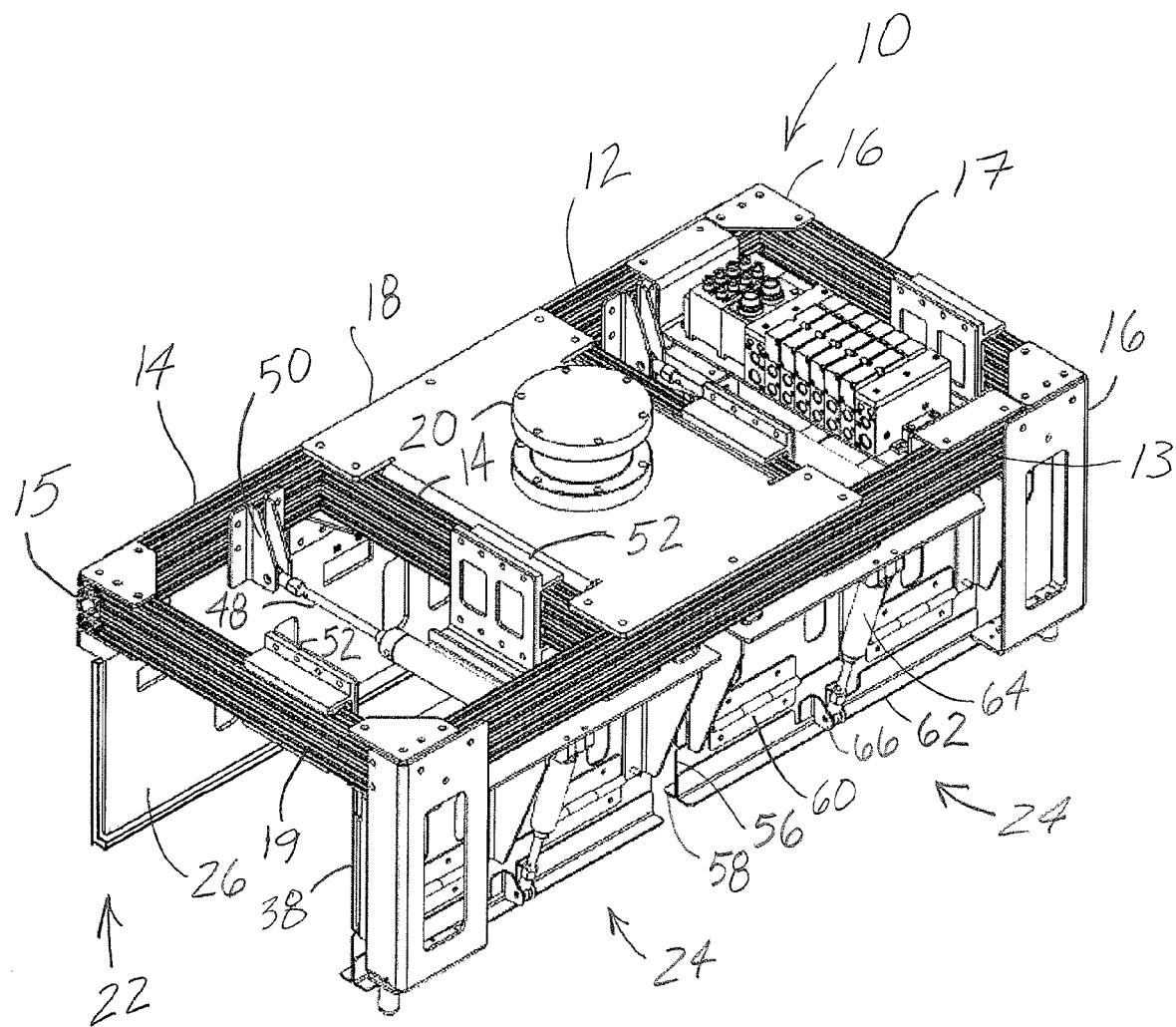
FIG. 2 is a perspective view of a head of the present invention.

The present invention is directed to a clamp head, or head 10 as shown in FIG. 2. FIG. 1 shows a plan view of a palletizing cell with which the clamp head 10 of the present invention may be used. A pallet is loaded onto each of two different pallet load locations; one pallet load zone location for boxes and the other for tray packs. An infeed conveyor provides tray packs filled with product, and a separate infeed conveyor provides boxes filled with products. The products used to fill the boxes can be the same or different than the products used to fill the tray packs. A robot, such as an anthropomorphic robot having an arm with a plurality of pivotable joints is secured to a head 10. As boxes and tray packs are brought adjacent to the robot, the robot directs head 10 to manipulate the box or tray pack, placing the box or tray pack onto the corresponding pallet load zone. The term manipulating refers to picking up the container from the conveyor and successfully placing the container on the pallet. Additionally, the term container as used herein can refer to a single product, but can also refer to a plurality of products contained in a box, crate or other semi-rigid enclosure, including boxes, tray packs or spot packs. It is to be understood that head 10 can also be used to manipulate spot packs. Optionally, once a layer of containers, also referred to as an array, has been arranged on the pallet, head 10 can be configured to place a slip sheet over the completed array. A slip sheet is a thin layer of material, such as paper board, that helps stabilize the arrays. Once a predetermined number of arrays have been arranged or stacked, such as four, or more, the full pallet is then unloaded from the palletizing cell for subsequent storage/transport to a destination.

Figure 3:
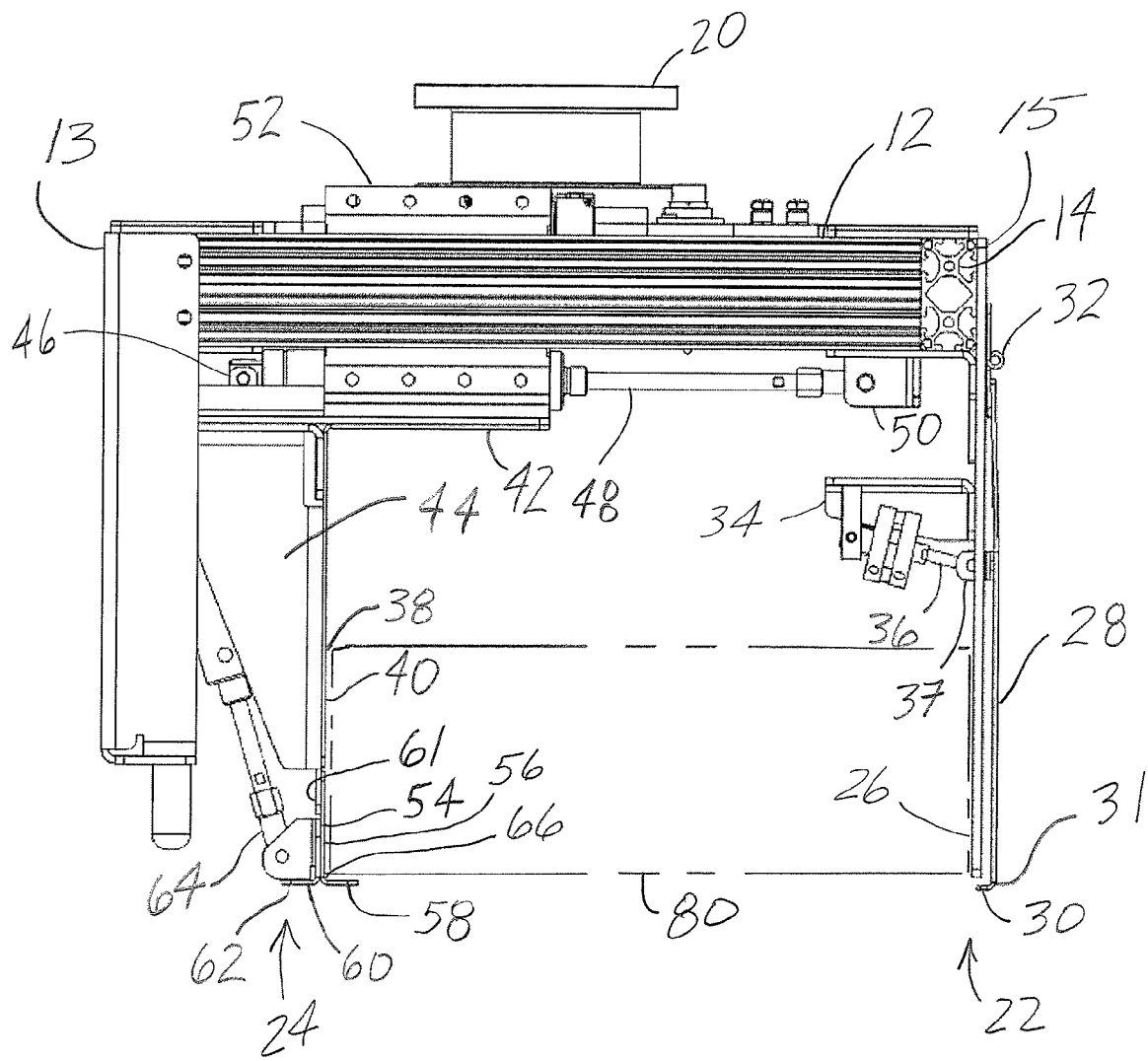
FIG. 3 is an end view of a head of the present invention.

Referring to FIGS. 2-3, head 10 includes a frame 12 composed of interconnected elongated members or rods 14, such as extruded rods having a double-X construction (FIG. 3) that provides enhanced structural stiffness and reduced weight. This construction also provides a spaced arrangement between adjacent legs of the "X's" to receive fasteners, simplifying fabrication of the frame. Connecting members 16 are preferably fastened along the junctures of ends of adjacent rods 14 to assemble the frame 12. However, it is to be understood that bonding methods, including welding or adhesives can also be used. Other structural members, including panel 18, are also used to provide further stiffening of frame 12 and to secure other components required for operation of head 10. A fitting 20 is adapted for connecting head 10 with the end of a robotic arm (FIG. 1).

Secured to one end of frame 12 adjacent to an end 15 is a clamping assembly 22. Clamping assembly 22 includes a portion or plate 26 that is fixedly secured to frame 12. Plate 26 preferably is substantially planar and extends substantially vertically downward and perpendicularly from frame 12. A portion or plate 28 is pivotably connected to plate 26 and/or frame 12 by a hinge 32. Plate 28 extends to a lip 30 opposite frame 12. A juncture 31 disposed between lip 30 and plate 28 is substantially parallel to the axis of rotation of hinge 32. An actuator 36, such as a pneumatic actuator, is pivotably secured to a structural member 34 at one end of actuator 36 and to a clevis 37 that is secured to plate 28. Lip 30 is of sufficient length to extend between plate 26 and an end 13 of frame 12 when actuator 36 is actuated to draw plate 28 sufficiently close to or into contact with plate 26. However, lip 30 is narrow. In other words, the length of lip 30 does not appreciably exceed the thickness of plate 26, although lip 30 does sufficiently extend past plate 26 to engage the corner of a box, tray pack, spot pack or other container or product for manipulation by head 10. Further, lip 30 is configured to engage a juncture of a base of a box or container or product that is substantially perpendicular to the corresponding wall of the box, tray pack or spot pack or other container or product.

It is to be understood that the position of actuator 36 is sufficiently distal from lip 30 so that head 10 can accommodate a container of a desired height.

Opposite clamping assembly 22 is a clamping assembly 24 that is configured to work with clamping assembly 22 for manipulating containers to form arrays on pallets. As shown in FIG. 3, clamping assembly 24 includes an angle 38 having segment or leg 40 and a leg 42 secured to a guide 52. Preferably, leg 40 is substantially planar, extends substantially vertically downward and is parallel to plate 26 and is structurally buttressed by a gusset 44. Leg 42 is secured to a guide 52 that is slidably movable so that leg 40 can be moved both toward and away from plate 26. An actuator 48, such as a pneumatic actuator, is pivotably connected to a clevis 46 or other structure secured to clamping assembly 24 and pivotably connected to a clevis 50 or other suitable structure secured to frame 12. By virtue of these connections, upon actuation of actuator 48 in one direction such that the distance between the ends of actuator 48 is increased, clamp assembly 24 is urged into movement via guide 52 away from clamping assembly 22. Conversely, upon actuation of actuator 48 in the other direction such that the distance between the ends of actuator 48 is decreased, clamp assembly 24 is urged into movement via guide 52 toward clamping assembly 22. When a container is to be manipulated, the robotic arm lowers head 10 so that a container 80 is disposed between clamp assemblies 22, 24 and clamp assembly 24 is moved toward clamp assembly 22 by actuation of actuator 48 until clamp assemblies 22, 24 exert an amount of compressive force on opposite sides of container 80.

Clamping assembly 24 further includes a structural member, such as an angle 54 having a leg 56 that preferably extends to a leg or lip 58, which is directed toward clamping assembly 22. Optionally, a structural member, such as an angle 60 having a leg 62 extending away from lip 58 is employed to provide enhanced strength and stiffness for angle 54. One portion of a hinge 61 is secured adjacent to one end of leg 40 opposite leg 42 and the opposite portion of hinge 61 is secured to an end of leg 56 opposite lip 58 so that angle 54 is pivotably connected to leg 40. An actuator 64, such as a pneumatic actuator, is pivotably secured at one end to angle 54 and secured at the other end to corresponding structure of clamping assembly 24. By virtue of these connections, upon actuation of actuator 64 in one direction such that the distance between the ends of actuator 64 is increased, lip 58 is urged into rotational movement about an axis of rotation defined by hinge 61 toward clamping assembly 22. Conversely, upon actuation of actuator 64 in the other direction such that the distance between the ends of actuator 64 is decreased, lip 58 is urged into rotational movement about the axis of rotation defined by hinge 61 away from clamping assembly 22. Preferably, the axis of rotation of hinge 61 is substantially parallel to a juncture 66 between lip 58 and leg 56.

In operation, once container 80 is brought to a predetermined position of the palletizing cell, such as by a conveyor, the robot arm directs head 10 over the container such that the container is disposed between clamping assemblies 22, 24. In one possible operating configuration, plate 28 is urged into rotational movement by actuator 36 so that lip 30 is disposed between plate 26 and clamping assembly 24. Similarly, angle 54 is urged into rotational movement by actuator 64 so that leg 56 of angle 54 is substantially parallel to leg 40 of angle 38. In this position, lip 58, which is directed toward clamping assembly 22, is disposed between leg 40 and clamping assembly 22. Stated another way, the facing surface of plate 26 is parallel to legs 40, 56.

Once plate 26 and legs 40, 56 are parallel, actuator 48 is actuated to urge clamping assembly 24 toward clamping assembly 22 until a predetermined compressive force is applied to opposed walls of container 80. The compressive force applied to the opposed sides of container 80, assuming the sides of the container are substantially parallel, essentially corresponds to an amount of lifting force equal to the amount of surface area of conformal contact between one of the faces of the container and plate 26 or legs 40, 56, multiplied by the amount of force perpendicular to the face of the container, and further multiplied by the static coefficient of friction between the container face and the surfaces of the clamping assemblies 22, 24. The compressive force, supplemented by the lifting support provided by lips 30, 58, is sufficient to manipulate container 80.

The combination of forces of actuators 48, 64 and 36 provide sufficient, but not excessive compressive force, to avoid buckling the container, while simultaneously providing sufficient lifting support by lips 30, 58 to permit manipulation by a single head construction of different types of containers, such as boxes, spot packs, tray packs and the like.

It is to be understood that there are different possible combinations of operating positions of lips 30, 58 in which either or both of lips 30, 58 may initially be in positions other than described above. However, prior to actual manipulation of container 80, the preferred position of lips 30, 58 is to engage opposed corners of container 80.

It is also to be understood that the amount of pressure necessary to manipulate container 80 is at least a function of the amount of surface area of the opposed walls of container 80, the stiffness of the container, the weight and arrangement of product in the container, and may also be affected by relative humidity or other factors.

The narrow lip 30 of plate 28 that is adjacent plate 26 is configured so that when head 10 is arranging an array of containers, especially when at least one container has already been installed, that clamping assembly 22 is brought into contact or close proximity with existing containers prior to head 10 releasing the container secured between clamping assemblies 22, 24. Due to the narrow profile of clamping assembly 22, containers can be arranged in a tighter grouping or array.

Figure 5:
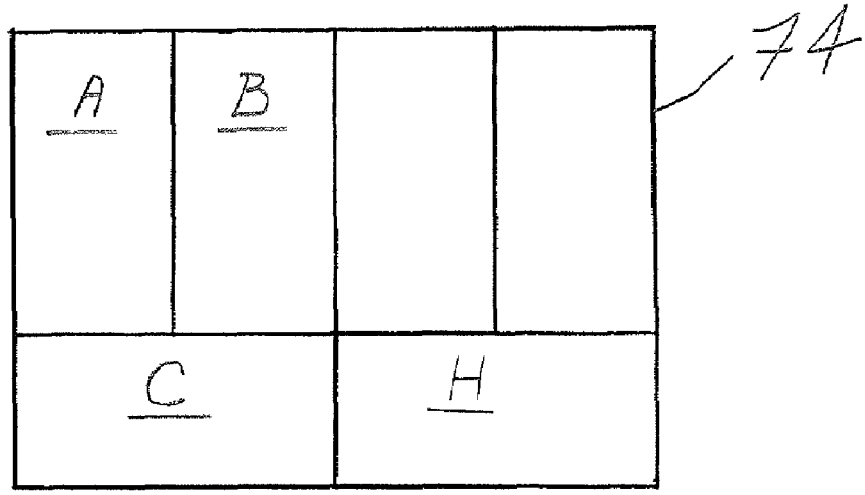
FIGS. 5-6 are alternate pallet product arrangements obtainable using a head of the present invention.
Figure 6:
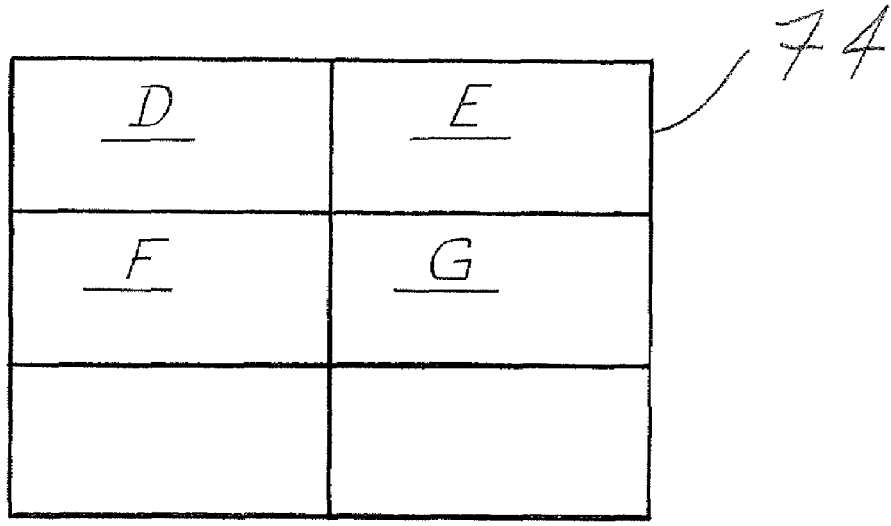

As shown in FIG. 2, head 10 can contain multiple clamping assemblies 24. Since actuators 36, 48 and 64 are independently operable, depending upon the size of the containers, it may be possible for head 10 to manipulate multiple containers at once, even if clamping assembly 22, 24 contact opposite sides of the same container. For example, FIGS. 5-6 schematically show pallet arrays, or portions of pallet arrays comprised of individual containers 74. Head 10 is capable of simultaneously manipulating two containers disposed end-to-end lengthwise, such as shown for container positions C and H as shown in FIG. 5, or container positions D and E or container positions F and G in FIG. 6. In a first manipulation step, head 10 simultaneously raises two containers, such as from a conveyor, and places the two containers in positions C and H as shown in FIG. 5, or container positions D and E or container positions F and G in FIG. 6, releasing the two containers simultaneously, if desired. In a second manipulation step, head 10 again simultaneously raises two containers. However, the two containers must be individually released in FIG. 5, since container positions A and B are not disposed end-to-end lengthwise. In one possible head movement path, an end 19 (FIG. 2) of head 10 is lowered adjacent container position C to release one container at container position B from between clamping assemblies 22, 24. Container release is achieved by actuating actuator 64 of the clamping assembly 24 that is in contact with the container to be released so that lip 58 is rotated away from the container. Similarly, an end 17 (FIG. 2) of head 10 is lowered adjacent container position C to release the other container at container position A from between clamping assemblies 22, 24. Container release is achieved by actuating actuator 64 of the clamping assembly 24 that is in contact with the container to be released so that lip 58 is rotated away from the container. Note that by this head path movement, end 15 is adjacent to the previously installed container at container position B, as previously discussed, which results in a more tightly grouped array of containers.

It is to be understood that head 10 can include more than two separably operable clamping assemblies 24, if desired.

Figure 4:
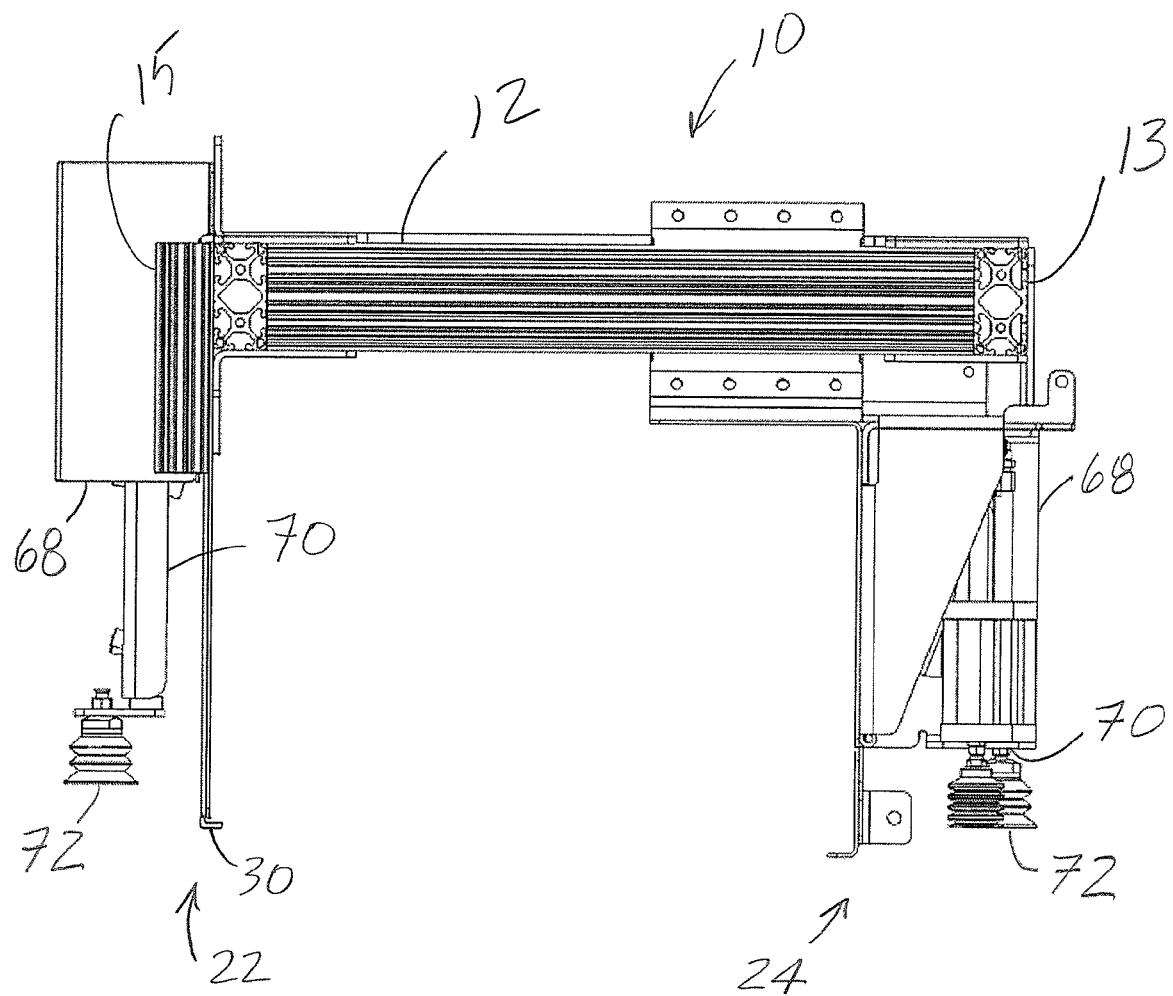
FIG. 4 is an end view of an embodiment of a head of the present invention.

FIG. 4 shows an alternate embodiment of head 10, including apparatus to place slip sheets between adjacent container arrays, or layer of containers. An actuator 68 is disposed adjacent end 15 of frame 12. Actuator 68 includes an arm 70 that extends away from frame 12, arm 70 extending to a plunger 72 operable for use with a pneumatic source, if desired. Similarly, a pair of actuators 68, including corresponding arms 70 and plungers 72, are disposed adjacent to end 13 of the head 10. In operation, plungers 72 are brought into contact with the top slip sheet from a stack of slip sheets by virtue of the arms 70 sufficiently extending so that the plungers 72 are brought into compressive physical contact with the slip sheet. The plunger 72 either is sufficiently flattened against the slip sheet surface or, by virtue of a pneumatic air source, to develop a vacuum inside the plungers 72 sufficient to lift the slip sheet for placement over the most recently arranged array of containers. Placing slip sheets between adjacent arrays of containers provides increased stability to the palletized containers. Preferably, arm 70 of actuator 68 retracts when not in use. Alternately, actuator 68 can rotate out of the way when not in use, so as not to interfere with operation of the head.

It is to be understood that other sources of power for the actuators, can include, but is not limited to, electric and hydraulic power.

It is also to be understood that the containers, for example, boxes and tray packs are not necessarily the same size, nor the same weight.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A clamp head for use in palletizing products comprising:
a body having a first end and an opposed second end;
a first clamping assembly comprising
   a first portion extending away from the body; and
   a second portion pivotably connected to the body adjacent the first portion, the first portion disposed between the second portion and the second end, the second portion extending to a second portion lip opposite the body, the second portion lip directed toward the second end and extendable between the first portion and the second end, the second portion having an axis of rotation that is substantially parallel to a juncture between the second portion lip and the second portion; and
at least one second clamping assembly movably secured to the body between the first clamping assembly and the second end, the at least one second clamping assembly movable toward and away from the first clamping assembly, the at least one second clamping assembly comprising
   a first segment extending away from the body; and
   a second segment pivotably connected to an end of the first segment opposite the body, the second segment extending to a second segment lip directed toward the first clamping assembly, the at least one second segment having an axis of rotation that is substantially parallel to the second segment lip;
wherein the first and second clamping assemblies are independently operable, and capable of manipulating a box, tray pack or spot pack containing products; and
wherein the second portion lip is narrower than the second segment lip.

2. The clamp head of claim 1 wherein facing surfaces of the first clamping assembly and the at least one second clamping assembly are maintained substantially parallel to each other.

3. The clamp head of claim 1 wherein the first portion, the first segment and the second segment are substantially planar.

4. The clamp head of claim 1 wherein movement of the first clamping assembly and the at least one second clamping assembly is achieved by pneumatic actuators.

5. The clamp head of claim 1 wherein each at least one second segment is independently operable from each other.

6. The clamp head of claim 1 further comprising a device extending from the body for manipulating a slip-sheet.

7. The clamp head of claim 6 wherein at least a portion of the device is retractable.

8. The clamp head of claim 7 wherein at least a portion of the device is rotatable.

9. The clamp head of claim 8 wherein the device uses pneumatic suction to manipulate a slip-sheet.

10. The clamp head of claim 1 wherein the clamp head is connected to the end of a robotic arm.

11. A robot for use in palletizing products comprising:
a base;
an arm having a plurality of pivoting joints, the arm extending from the base to a clamp head comprising
   a body having a first end and an opposed second end;
   a first clamping assembly comprising
      a first portion extending away from the body; and
      a second portion pivotably connected to the body adjacent the first portion, the first portion disposed between the second portion and the second end, the second portion extending to a second portion lip opposite the body, the second portion lip directed toward the second end and extendable between the first portion and the second end, the second portion having an axis of rotation that is substantially parallel to a juncture between the second portion lip and the second portion; and
   at least one second clamping assembly movably secured to the body between the first clamping assembly and the second end, the at least one second clamping assembly movable toward and away from the first clamping assembly, the at least one second clamping assembly comprising
      a first segment extending away from the body; and
      a second segment pivotably connected to an end of the first segment opposite the body, the second segment extending to a second segment lip directed toward the first clamping assembly, the at least one second segment having an axis of rotation that is substantially parallel to the second segment lip;
wherein the first and second clamping assemblies are independently operable, and capable of manipulating a box, tray pack or spot pack containing products; and
wherein the second portion lip is narrower than the second segment lip.

12. The robot of claim 11 wherein facing surfaces of the first clamping assembly and the at least one second clamping assembly are maintained substantially parallel to each other.

13. The robot of claim 11 wherein the first portion, the first segment and the second segment are substantially planar.

14. The robot of claim 11 wherein movement of the first clamping assembly and the at least one second clamping assembly is achieved by pneumatic actuators.

15. The robot of claim 11 wherein each at least one second segment is independently operable from each other.

16. The robot of claim 11 further comprising a device extending from the body for manipulating a slip-sheet.

17. The robot of claim 16 wherein at least a portion of the device is retractable.

18. A robotic clamp head for use in palletizing products comprising:
a frame having a first end and an opposed second end;
a first clamping assembly comprising
   a substantially planar first portion extending substantially vertically away from the frame; and
   a second portion pivotably connected to the frame adjacent the first portion, the first portion disposed between the second portion and the second end, the second portion extending to a second portion lip opposite the frame, the second portion lip directed toward the second end and extendable between the first portion and the second end, the second portion having an axis of rotation that is substantially parallel to a juncture between the second portion lip and the second portion, the second portion being movable by a pneumatic actuator; and a pair of second clamping assemblies, each second clamping assembly movably secured to the frame between the first clamping assembly and the second end of the frame, each of the pair of second clamping assemblies movable toward and away from the first clamping assembly by a pneumatic actuator, each second clamping assembly comprising
- a substantially planar first segment extending substantially vertically away from the frame; and
- a second segment pivotably connected to an end of the first segment opposite the frame, the second segment extending to a second segment lip directed toward the first clamping assembly by a pneumatic actuator, the at least one second segment having an axis of rotation that is substantially parallel to a juncture between the second segment lip and the second segment; and wherein the first and second clamping assemblies are independently operable, and capable of manipulating a box or a tray pack containing products.

19. A clamp head for use in palletizing products comprising:

a body having a first end and an opposed second end;

a first clamping assembly comprising
- a first portion extending away from the body; and
- a second portion pivotably connected to the body adjacent the first portion, the first portion disposed between the second portion and the second end, the second portion extending to a second portion lip opposite the body, the second portion lip directed toward the second end and extendable between the first portion and the second end, the second portion having an axis of rotation that is substantially parallel to a juncture between the second portion lip and the second portion; and at least one second clamping assembly movably secured to the body between the first clamping assembly and the second end, the at least one second clamping assembly linearly movable toward and away from the first clamping assembly, the at least one second clamping assembly comprising
- a first segment extending away from the body; and
- a second segment pivotably connected to an end of the first segment opposite the body, the second segment extending to a second segment lip directed toward the first clamping assembly, the at least one second segment having an axis of rotation that is substantially parallel to the second segment lip; and wherein the first and second clamping assemblies are independently operable, and capable of manipulating a box, tray pack or spot pack containing products.

20. The clamp head of claim 19 wherein the second portion lip is narrower than the second segment lip.

21. The clamp head of claim 19 further comprising a device extending from the body for manipulating a slip-sheet, wherein at least a portion of the device is retractable.

* * * * *